US012699413B2

(12) United States Patent
Escher et al.

(10) Patent No.: US 12,699,413 B2
(45) Date of Patent: Aug. 4, 2026

(54) PEDAL UNIT FOR CONTROLLING A VEHICLE FUNCTION

(71) Applicant: Robert Bosch GmbH, Stuttgart (DE)

(72) Inventors: Guenter Escher, Oberstdorf (DE); Eduard Maiterth, Heilbronn (DE); Juergen Kissner, Oppenweiler (DE); Manfred Fischer, Oppenweiler (DE); Martin Baeuml, Weitnau (DE); Matthias Maidel, Buchenberg (DE); Timo Knecht, Mundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/654,435

(22) Filed: May 3, 2024

(65) Prior Publication Data

US 2024/0377852 A1 Nov. 14, 2024

(51) Int. Cl.
*G05G 1/48* (2008.04)

(52) U.S. Cl.
CPC .................................... *G05G 1/48* (2013.01)

(58) Field of Classification Search
CPC .. G05G 1/30; G05G 1/46; G05G 1/48; G05G 1/483; G05G 1/487
See application file for complete search history.

(56) References Cited

U.S. PATENT DOCUMENTS 1,159,923 A * 11/1915 Gaston .................. G05G 1/487 74/563
1,210,016 A * 12/1916 Sunden .................. G05G 1/487 74/563
8,340,863 B2 * 12/2012 Karatsinides .......... B60K 23/00 701/36
10,948,941 B2 * 3/2021 Dohmen .................. B60T 7/06
2003/0024344 A1 * 2/2003 Liu ........................ G05G 1/483 74/563
2018/0099608 A1 * 4/2018 Salter ..................... G05G 1/487

(Continued)

FOREIGN PATENT DOCUMENTS

DE 102 39 913 A1 3/2004
DE 103 12 547 A1 10/2004
DE 20 2008 008 594 U1 11/2008

(Continued)

OTHER PUBLICATIONS

Machine translation of DE 202008008594 U1 obtained on Jan. 7, 2025.*

(Continued)

*Primary Examiner* — Adam D Rogers
(74) *Attorney, Agent, or Firm* — Maginot, Moore & Beck LLP

(57) ABSTRACT

A pedal unit for controlling a vehicle function has a modularly constructed pedal head which includes a pad support and a replaceable pedal pad for receiving an actuation force of a driver's foot and connected to a small stroke movable housing cover along a vertical direction of the pedal unit. The pedal pad is releasably connected to the pad support. A fastening arrangement is configured to connect the pad support to the movable housing cover in a releasable and form-fit and/or friction-fit manner as well. A method for assembling such a pedal unit and a method for disassembling a pedal head from such a pedal unit is also disclosed.

17 Claims, 7 Drawing Sheets

(56) References Cited

U.S. PATENT DOCUMENTS

| | | | | |
|---|---|---|---|---|
| 2025/0326379 | A1 * | 10/2025 | Escher | B60T 7/06 |

FOREIGN PATENT DOCUMENTS

| | | | | | |
|---|---|---|---|---|---|
| DE | 10 2019 004 525 | A1 | | 1/2021 | |
| DE | 102023209112 | A1 | * | 3/2025 | B60T 7/042 |
| DE | 102023209124 | A1 | * | 3/2025 | G05G 1/42 |
| DE | 102023209131 | A1 | * | 3/2025 | |
| DE | 102023209134 | A1 | * | 3/2025 | |
| DE | 102024203304 | A1 | * | 10/2025 | B60T 7/042 |
| DE | 102024203607 | A1 | * | 10/2025 | B60T 7/04 |
| FR | 2902902 | A1 | * | 12/2007 | F16B 19/004 |
| FR | 3 058 923 | A1 | | 5/2018 | |
| FR | 079 317 | A1 | | 9/2019 | |
| FR | 096 795 | A1 | | 12/2020 | |
| GB | 1475290 | A | * | 6/1977 | B60T 7/042 |
| KR | 10-2009-0067353 | A | | 6/2009 | |
| KR | 101314942 | B1 | * | 10/2013 | B60K 28/14 |
| WO | WO-2023210542 | A1 | * | 11/2023 | |

OTHER PUBLICATIONS

Machine translation of FR 2902902 A1 obtained on Jan. 8, 2025.*

Form-fit connection from Wikipedia; https://en.wikipedia.org/wiki/Form-fit_connection.*

* cited by examiner

PEDAL UNIT FOR CONTROLLING A VEHICLE FUNCTION

This application claims priority under 35 U.S.C. § 119 to patent application no. DE 10 2023 204 205.3, filed on May 8, 2023 in Germany, the disclosure of which is incorporated herein by reference in its entirety.

The disclosure relates to a pedal unit for controlling a vehicle function. The subject matter of the present disclosure is also a method for assembling such a pedal unit and a method of disassembling a pedal head from such a pedal unit.

BACKGROUND

Drive-by-wire system which transmit driver commands only electrically or electronically are known from the prior art. Known examples of such drive-by-wire systems are referred to as electronic accelerator pedals for drive control, a brake-by-wire system for brake control, or a steer-by-wire system for steering control. Drive-by-wire refers to driving or controlling a vehicle without mechanical transmission of power from control elements, such as the accelerator pedal, brake pedal or steering wheel, to the corresponding actuating elements of the vehicle, such as the throttle, brakes and/or steering of the vehicle. In other words, in such drive-by-wire systems, the corresponding pedal unit is decoupled from the power flow, and the aforementioned functions are instead controlled via electrical lines and servo motors or electromechanical actuators. Sensor devices of the drive-by-wire systems conventionally detect a driver specification using force-based sensor units to determine the desired intensity of braking or acceleration of the vehicle and to adjust it accordingly via the powertrain and brake system. Eliminating the mechanical connection makes it possible to implement new pedal concepts, because there is no longer a need for a large pedal travel to achieve vehicle deceleration or vehicle acceleration.

DE 103 12 547 A1 discloses a device for accelerating or decelerating a motor vehicle comprising two actuating elements. A first actuating element is used for accelerating, and a second actuating element is used for decelerating the motor vehicle. The actuating elements are actuated by applying a hand or foot force. The operation of the two actuating elements is largely without travel, and the speed of the motor vehicle is kept constant after the hand or foot force is removed from the first actuating element or from the second actuating element as a function of the most recently applied hand or foot force until the first actuating element or the second actuating element are actuated again.

An actuating means for influencing a brake, clutch, or drive system of a motor vehicle is known from DE 102 39 913 A1. The actuating means actuated by a driver is mechanically decoupled from the actuators of the system. The actuating means in this case is a transducer that detects only the driver's actuating force and generates a control signal, the generation of which is independent of an actuation path and does not have an actuation path.

SUMMARY

The pedal unit for controlling a vehicle function with the features set forth below has the advantage that the pedal pad can be easily replaced after the pedal head is disassembled without damaging the movable cover or a sensor housing in which a sensor arrangement is arranged due to the modular construction of the pedal head and the releasable attachment of the pedal head and the movable cover of the pedal head. The pedal pad is subject to wear and tear through constant use. The vehicle owner may wish to replace the pedal pad with other approved variants for wear reasons or for optical reasons (design). As the replacement of the pedal pad requires force, for example because rubber lips must be widened in order to release the pedal pad from the pad support or to fix it to the pad support, it is advantageous to release the pedal head from the movable housing cover beforehand. Occasionally, heating rubber components of the pedal pad with a hot air dryer is helpful. Inexperienced persons quickly use screwdrivers and thus lever the pedal pad to its position. As pedal units for controlling vehicle functions for drive-by-wire systems include sensor arrangements, which should not be subjected to undefined lever forces with, for example, large screwdrivers (exceptional misuse), the separability of the pad support from the movable housing cover of the pedal unit is very advantageous. Thus, all work on the pedal pad or on the pad support can then be carried out when disassembled without exerting force on the movable cover or the sensor housing comprising the sensor arrangement.

Embodiments of the present disclosure provide a pedal unit for controlling a vehicle function, having a modularly constructed pedal head which comprises a pad support and a replaceable pedal pad for receiving an actuating force of a driver's foot and is connected to a housing cover that is movable via a small stroke along a vertical direction of the pedal unit. The pedal pad is releasably connected to the pad support. In this case, a fastening arrangement is configured to connect the pad support to the movable housing cover in a releasable and form-fit and/or friction-fit manner.

In addition, a method for assembling such a pedal unit is proposed. In this case, the pedal unit is mounted in the vehicle without a pedal head, and then the pedal head, which comprises a pedal pad releasably mounted on a pad support, is attached on a movable housing cover of the pedal unit, such that the pad support of the pedal head is connected to the movable housing cover of the pedal unit in a releasable and form-fit and/or friction-fit manner.

Furthermore, a method for disassembling a pedal head from such a pedal unit is proposed. In this case, a form-fit and/or friction-fit connection is released between a pad support of the pedal head and a movable housing cover of the pedal unit, and the pedal head is subsequently lifted off the movable housing cover.

The movable housing cover may preferably be connected to a sensor housing, in which at least one sensor arrangement is arranged. The at least one sensor arrangement may be configured to detect and evaluate the stroke movement of the movable housing cover. The controllable vehicle function can, e.g., be a braking function or an acceleration function.

In pedal units having a small actuation stroke, the sensor housing is typically fixed. The pedal head having a replaceable pedal pad has a relatively fixed position and, in conjunction with the movable housing cover, only has a small stroke along the vertical direction of the pedal unit. Also, the pedal pad may have a support structure for a better grip of the driver's foot. The small stroke of the housing cover in the vertical direction of the pedal unit is preferably in the range of 1 mm to 10 mm. When arranging the housing cover on a flexible beam, the small stroke may even be below a value of 1 mm and be reduced to a value in the micrometer range. One advantage of the pedal units with a small stroke is the possibility of positioning the respective pedal unit up to the movable cover and the pedal head in a vehicle interior panel or under a carpet, such that only the pedal head is visible.

The carpet may then be positioned on a carrier plate or on a manufacturer's support. This means that a cut-out of the carpet is limited only to the size of the movable cover. If the carpet also had to take into account the larger contour of the pedal head, the cut-out would have to be larger, which would have a negative impact on the overall look. With retrofittable pedal heads, the cut-outs in the carpet reduce to the minimum necessary dimension and are almost completely covered by the pedal heads mounted thereafter. The carpet cut-out may be made even smaller if the carpet rests on a modified movable cover at the top and only leaves the cut-out for assembling the pedal head or the pad support or the size of the components of the fastening arrangement arranged on the movable cover.

If the pedal head with the pad support and the pedal pad already fixed is only to be assembled after the sensor housing with the movable cover or the carpet has been assembled by the vehicle manufacturer, this assembly process should be carried out very quickly, securely and without tools if possible for cycle time reasons. This can be implemented, for example, by connecting the pad support to the movable housing cover via a latching and/or plug connection without tools. For disassembly, at least one simple auxiliary tool may then be employed to loosen the latching and/or plug connection. This means that the form-fit and/or force-fit connection can preferably be released with at least one simple auxiliary tool.

The at least one sensor arrangement can comprise a movable measuring transducer and a sensor electronics means. Preferably, the at least one sensor arrangement may be configured to detect the small stroke movement of the movable housing cover in a contactless manner. In the present case, the term "sensor electronics means" is understood to mean an electric circuit or component comprising at least one sensor element, which can detect and process or evaluate magnetic, and/or inductive, and/or capacitive signals from the measuring transducer in a contactless manner. A Hall sensor based on a magnetic principle can preferably be used for contactless detection of the small stroke movement. Alternatively, a force sensor may also be used to detect the stroke movement, which can be coupled to the movable housing cover via a spring element. For example the changing spring force can be converted into voltage changes in a sensor element configured as a strain gauge, which can then be amplified and evaluated. Of course, other suitable measuring methods known from the prior art, for example optical, inductive or capacitive measuring methods, can also be used to detect and evaluate the small stroke movement of the movable housing cover. The sensor electronics means can comprise a printed circuit board and at least one electrical or electronic component arranged on the printed circuit board. The at least one component can, e.g., be what is referred to as an ASIC component or a microcontroller, which can include various functions for detecting and evaluating the sensor signals. However, it is also possible for the at least one component to be designed as an integrated circuit or as a discrete component. Software modules which are, e.g., provided on the microcontroller can also be used to evaluate and/or further process the detected signals. Also advantageous is a computer program product comprising program code stored on a machine-readable carrier, e.g., a semi-conductor memory, a hard disk memory, or an optical memory and used in order to perform the evaluation when the program is executed.

Advantageous improvements to the pedal unit for controlling a vehicle function specified herein are made possible by the measures and embodiments specified below.

It is particularly advantageous that the fastening arrangement can comprise at least one latching element and at least one latching element receptacle which can be configured to form a latching connection between the pad support and the movable housing cover when mounted and to prevent or at least make it difficult to move the pad support in the disassembly direction. Alternatively, the fastening arrangement can comprise at least one bolt element and at least one bolt element receptacle, which can be arranged to block movement of the pad support in the disassembly direction when mounted.

In one advantageous embodiment of the pedal unit, the at least one latching element can be configured as a spring-elastic retaining clip with at least one latching lug. The corresponding at least one latching element receptacle can be configured as a latching opening, into which at least the at least one latching lug of the at least one latching element is inserted when mounted and engages behind a wall of the at least one latching opening. This means that the pedal head is attached on the pad support during assembly until the at least one latching lug snaps into its latching position. This is usually associated with a clicking noise, which can be used as a sign of a successful attachment of the pedal head. By engaging behind the wall of the latching opening with the at least one latching lug, it is possible to prevent the pedal head from being lifted off of the movable housing cover. Alternatively, the at least one latching element receptacle may be configured as a latching groove, which at least partially encompasses the at least one latching element when mounted.

In one alternative embodiment of the pedal unit, the at least one latching element can be configured as a resilient pressure piece with at least one latching bolt. The corresponding at least one latching element receptacle can be configured as a latching bore, into which the at least one latching bolt is at least partially inserted when mounted. This means that the latching bolt of the resilient pressure piece is tensioned when the pedal head is attached on the pad support and releases when the desired attachment position is reached in the at least one latching element receptacle configured as a latching bore. This release is usually associated with a clicking noise, which can be used as a sign of a successful placement of the pedal head.

In a further advantageous embodiment of the pedal unit, the at least one bolt element can be configured as a pin, which can be at least partially inserted into a bolt element receptacle configured as a locking bore when mounted. This means that the at least one latching element configured as a pin is at least partially inserted into the locking bore when the pedal head attached on the pad support has reached its desired attachment position. In this case, the bolt element can be guided through a through-hole on the pad support and at least partially guided into a locking bore configured on the housing cover. Alternatively, the bolt element can be guided through a through-hole on the housing cover and at least partially inserted into a locking bore configured on the pad support. Both embodiments can be used to block a movement of the pad support in the disassembly direction when mounted.

In a further advantageous configuration of the pedal unit, the at least one latching element or the at least one bolt element can be arranged on the pad support and the at least one latching element receptacle or the at least one bolt element receptacle can be arranged on the movable housing cover. Alternatively, the at least one latching element or the at least one bolt element can be arranged on the moveable housing cover and the at least one latching element receptacle or the at least one bolt element receptacle can be arranged on the pad support.

BRIEF DESCRIPTION OF THE DRAWINGS

Exemplary embodiments of the disclosure are illustrated in the drawings and explained in more detail in the following description. In the drawings, identical reference signs refer to components or elements performing identical or similar functions.

DETAILED DESCRIPTION

Figure 1:
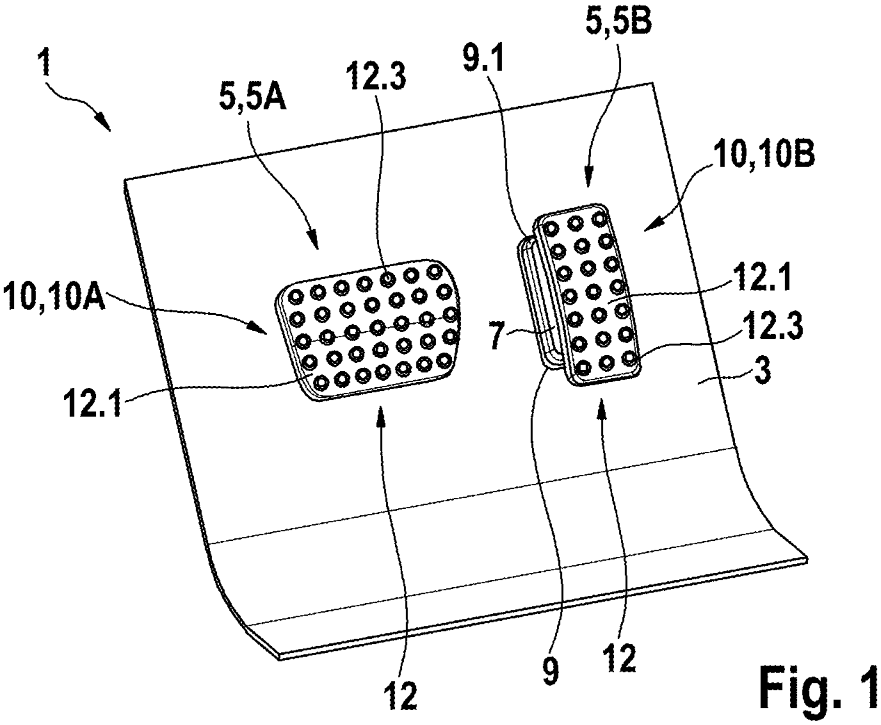
FIG. 1 shows a schematic perspective view of a section of a footwell of a vehicle having a pedal assembly, which comprises two exemplary embodiments of a pedal unit according to the disclosure for controlling a vehicle function.

As can be seen in FIGS. 1 to 13, the illustrated exemplary embodiments of a pedal unit 5 according to the invention for controlling a vehicle function each comprise a modularly structured pedal head 10, 10A, 10B, 10C, 10D, which comprises a pad support 14 and a replaceable pedal pad 12 for receiving an actuating force of a driver's foot and is connected to a housing cover 7 that is movable via a small stroke along a vertical direction z of the pedal unit 5. The pedal pad 12 is releasably connected to the pad support 14. A fastening arrangement 20, 20A, 20B, 20C, 20D connects the pad support 14 to the movable housing cover 7 in a releasable and form-fit and/or friction-fit manner.

Figure 2:
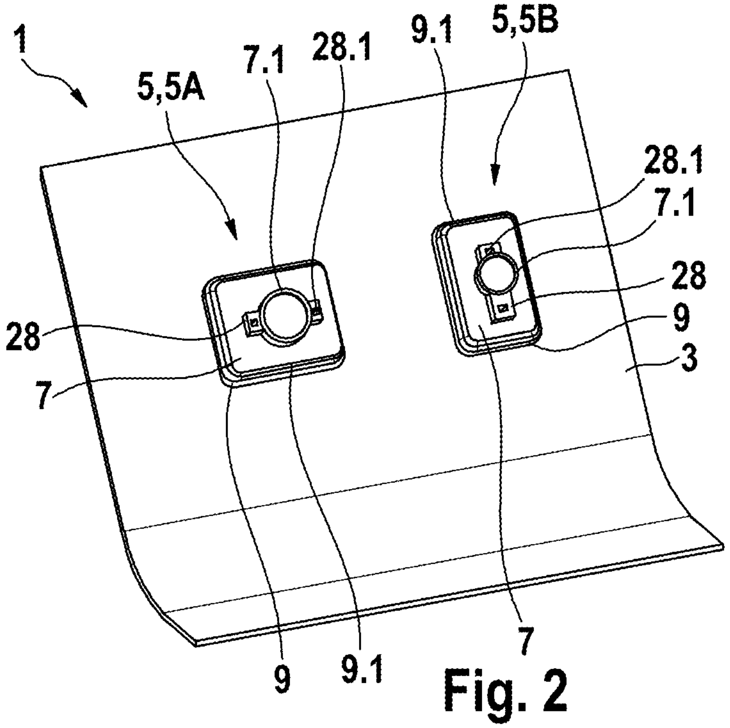
FIG. 2 shows a schematic perspective view of the section of the footwell of the vehicle in FIG. 1 with the pedal units according to the disclosure without mounted pedal heads.
Figure 2A:
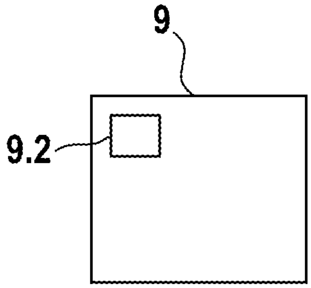
FIG. 2*a* shows a schematic view of a sensor arrangement in the sensor housing of FIG. 2.
Figure 3:
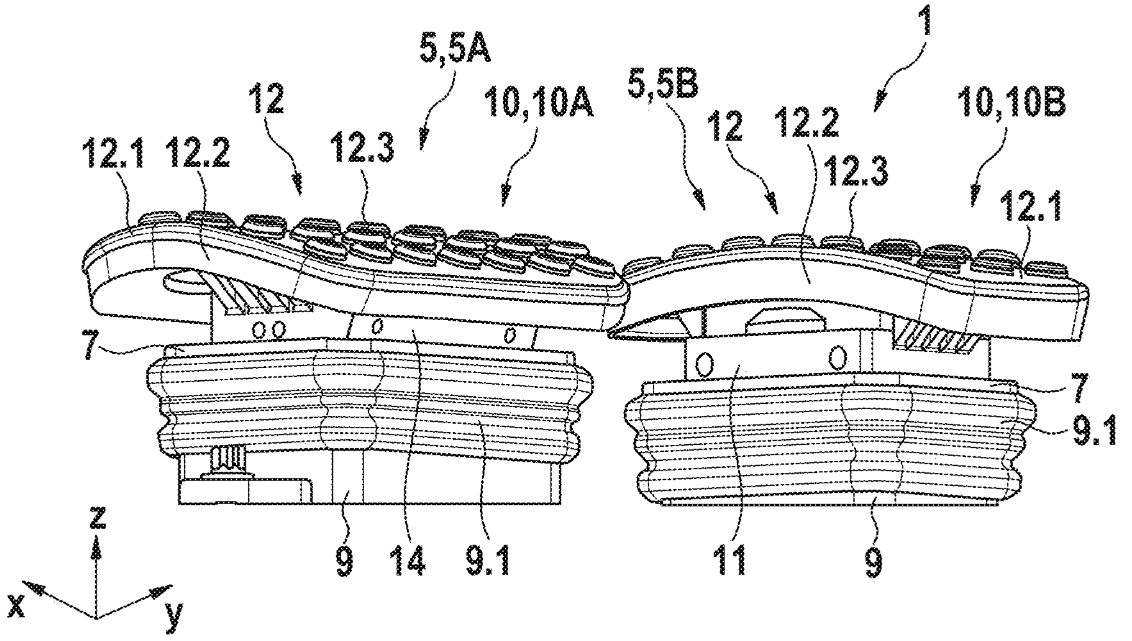
FIG. 3 shows a schematic perspective lateral view of the upper portions of the two pedal units according to the disclosure for controlling a vehicle function of FIGS. 1 and 2 without a carpet.

As can be further seen from FIGS. 1 and 2, the pedal arrangement 1 shown comprises two pedal units 5. Here, a first pedal unit 5 is configured as a brake pedal 5A for executing a braking function. A second pedal unit 5 is configured as the accelerator pedal 5B for executing an acceleration function. As can further be seen from FIG. 1, the two pedal units 5 are positioned under a carpet 3, apart from the movable cover 7 and the pedal head 10, such that only the pedal head 10 is visible. The carpet 3 is positioned by the vehicle manufacturer on a non-visible carrier plate or support. As can be further seen from FIGS. 1 and 2, the pedal units 5 of the pedal arrangement 1 shown no longer have a boom for the pedal head 10. This improves both the appearance and also crash safety. As can be seen in particular in FIG. 2, the cut-outs of the carpet 3 are only limited to the size of the movable housing cover 7 or a bellows-like seal 9.1 between the movable housing cover 7 and a sensor housing 9. A sensor arrangement 9.2 schematically shown in FIG. 2*a* is arranged in the sensor housing 9 which comprises at least one sensor element and corresponding sensor electronics means for the detection and evaluation of the small stroke movement of the movable housing cover 7 in the range of 0 mm to 10 mm.

As can further be seen from FIGS. 1 to 13, the pedal pad 12 of the pedal head 10 comprises a curved stainless steel deep-drawing bowl 12.1, which is combined with a curved rubber component 12.2, such that a nub-shaped support structure 12.3 protruding from the deep-drawing shell 12.1 is formed created on a top side of the deep-drawing bowl 12.1. The support structure 12.3 can prevent or at least make it difficult for the driver's foot to slip. As can be seen in particular from FIGS. 5, 9 and 13, the pedal pad 12 is fixedly mounted on the pad support 14. For this purpose, the rubber component 12.2 comprises a circumferential receiving groove 12.4, in which a circumferential edge of the pad support 14 is inserted, such that a wall of the receiving groove 12.4 configured as a flexible lip 12.5 encompasses the edge of the pad support 14.

As can be seen in particular from FIGS. 2.4 and 13, the movable housing cover 7 in the illustrated exemplary embodiments is hat-shaped with a cylindrical spring receptacle 7.1, which is closed at one end by a cover and has a receiving opening at the other end. In this case, the cover of the spring receptacle 7.1 faces the pedal head 10 with the pad support 14. The pad support 14 comprises a recess 14.1, which at least partially receives the cover 13.1 of the cylinder-shaped spring receptacle 7.1 or the cylindrical spring receptacle 7.1. In the exemplary embodiments of the pedal unit 5A, 5B shown in FIGS. 1 to 9, the movable housing cover 7 has a rectangular basic shape with rounded corners. In the exemplary embodiment of the pedal unit 5C shown in FIGS. 10 to 13, the movable housing cover 7 has a round, conically tapering basic shape.

As can be further seen from FIGS. 4 to 13, the illustrated exemplary embodiments of the fastening arrangement 20, 20A, 20B, 20C, 20D each comprise at least one latching element 22 and at least one latching element receptacle 24, which form a latching connection between the pad support 14 and the movable housing cover 7 when assembled and prevent or at least make it difficult to move the pad support 14 in the disassembly direction.

Various embodiments of the fastening arrangement 20, 20A, 20B, 20C, which may also be used for the pedal unit designed as an accelerator pedal 5B, are described below using the example of the pedal unit 5 configured as a brake pedal 5A with reference to FIGS. 4 to 9. Referring to FIGS. 10 to 13, a further alternative embodiment of the fastening arrangement 20D is described using the example of a pedal unit 5 configured as an accelerator pedal 5C, which may also be used for a pedal unit 5 configured as a brake pedal with a round housing cover 7.

Figure 4:
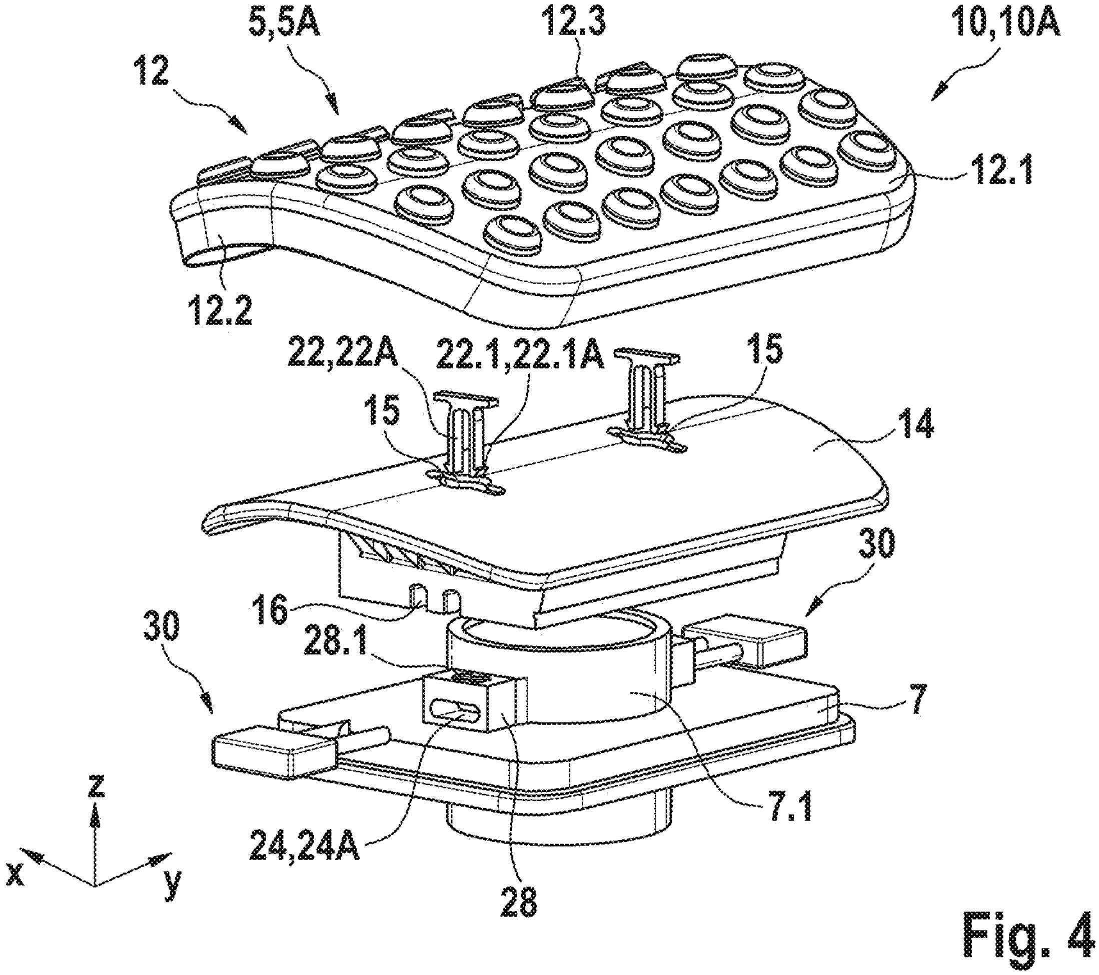
FIG. 4 shows a schematic exploded perspective view of components of a first exemplary embodiment of a fastening arrangement for fastening a pedal head with a movable housing cover for the pedal units of FIGS. 1 to 3 according to the disclosure.
Figure 5:
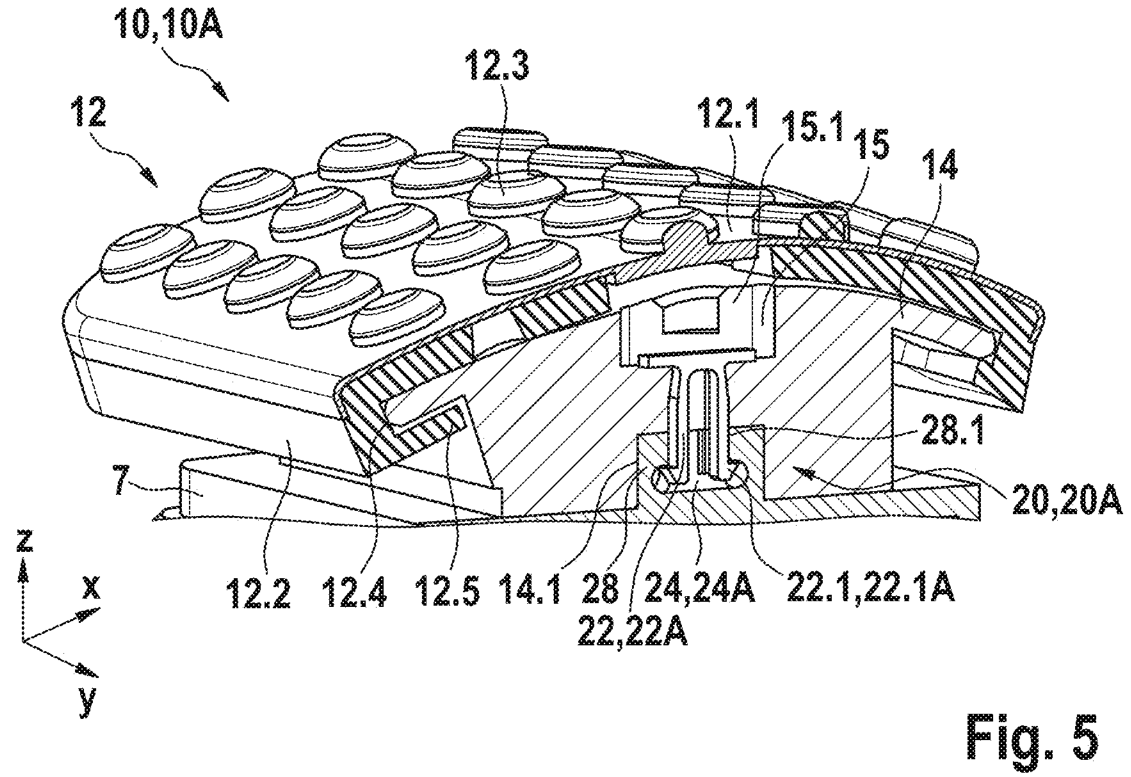
FIG. 5 shows a schematic perspective view of the first exemplary embodiment of the fastening arrangement in FIG. 4 for fastening the pedal head with a movable housing cover for the pedal units of FIGS. 1 to 3 according to the disclosure.
Figure 6:
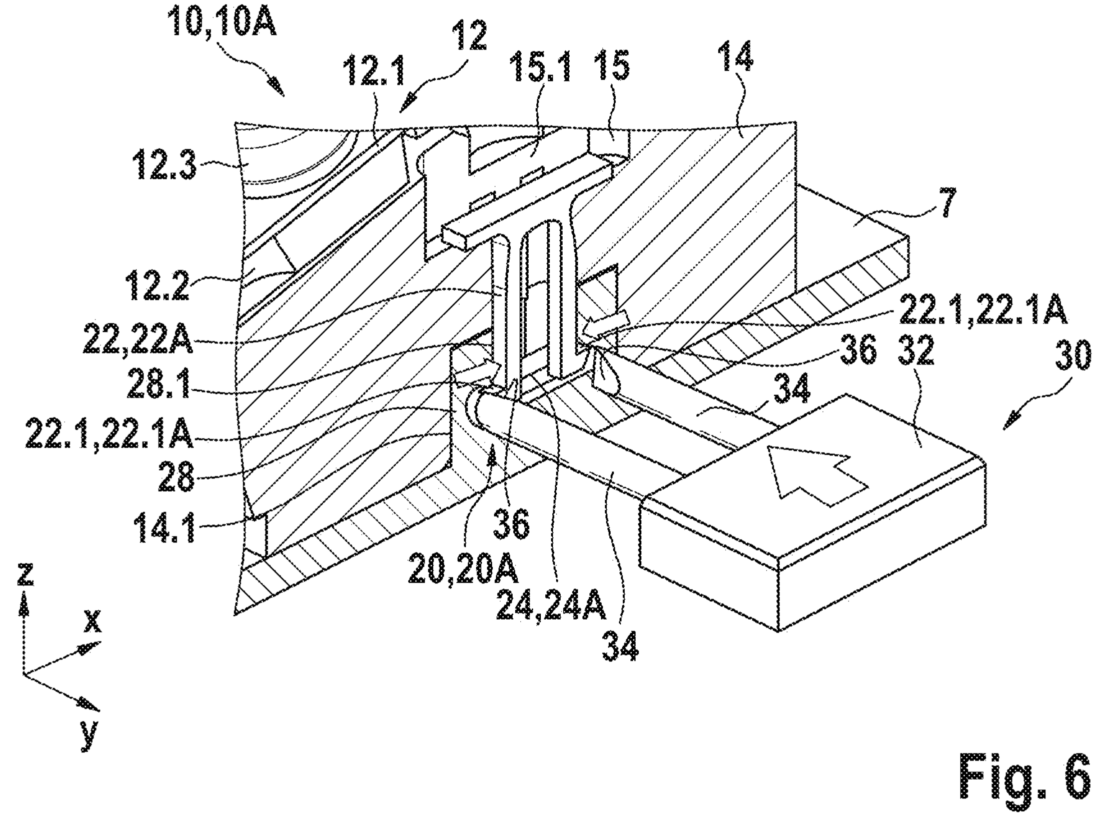
FIG. 6 shows a schematic perspective cross-sectional view of a section of the fastening arrangement in FIG. 5 during a disassembly process.

As can be further seen from FIGS. 4 to 6, the pedal unit 5 configured as a brake pedal 5A in the first exemplary embodiment of the fastening arrangement 20A comprises two latching elements 22 configured as spring-elastic Pi-shaped retaining clips 22A. The Pi-shaped retaining clips 22A comprise two parallel webs, which are connected at one end via a transverse web. At the free ends, the two webs each have an outwardly-facing latching lug 22.1A. In the illustrated first exemplary embodiment of the fastening arrangement 20A, two latching element receptacles 24, each configured in a fastening block 28, are designed as a latching opening 24A, into which at least the two latching lugs 22.1A of the respective latching element 22 are inserted when mounted as shown in FIGS. 5 and 6 and engage behind a wall of the corresponding latching opening 24A. The two webs of the Pi-shaped retaining clips 22A are inserted into the corresponding receiving openings 15 in the pad support 14 with the latching elements 12.1A, such that the free ends with the latching elements 22.1A are guided through an opening and project into a recess 14.1 in the pad support 14 and the transverse web of the respective Pi-shaped retaining clip 22A abuts an edge of the opening. In the illustrated exemplary embodiment, the individual Pi-shaped retaining clips 22A are fixed in the corresponding receiving opening 15 of the pad support 14 by forming the plastic-made pad support 14 such that a resulting plastic fixation 15.1 fixes the transverse web of the respective Pi-shaped retaining clip 22A on the pad support 14. As a further alternative, the Pi-shaped retaining clips 22A may be fastened by inserting hold-downs between the pad support 14 and pedal pad 12. After fastening the Pi-shaped retaining clips 22A to the pad support 14, the pedal pad 12 is applied to the pad support 14 by widening and/or heating the flexible lip 12.5 of the pedal pad 12, such that the wall of the receiving groove 12.4 encompasses the edge of the pad support 14 and the pedal pad 12 covers the two receiving openings 15 of the pad support 14.

In a method for assembling such a pedal unit 5 according to the disclosure, it is mounted in the vehicle without a pedal head 10. This means that initially only the sensor housing 9 is mounted in the vehicle with the movable housing cover 7 of the corresponding pedal unit 5. This assembly state is shown in FIG. 2, in which the first pedal unit 5 configured as a brake pedal 5A without pedal head 10A and the pedal unit 5 configured as an accelerator pedal 5B without pedal head 10B are mounted in the footwell of the vehicle and partially covered by the carpet 3. The pedal heads 10A, 10B, each of which comprises a pedal pad 12, which can be releasably attached to a pad support 14, are then each attached to a movable housing cover 7 of the corresponding pedal unit 5, such that the pad support 14 of the respective pedal head 10A, 10B is connected to the movable housing cover 7 in a releasable and form-fit and/or friction-fit manner.

As can be further seen from FIGS. 4 to 6, the latching lugs 22.1A have lead-in chamfers. When the pedal head 10A is placed on the movable housing cover 7, these lead-in chamfers of the latching lugs 22.1A abut the edge of corresponding insertion openings 28.1 in the mounting block 28, which each open into one of the latching element receptacles 24 configured as latching openings 24A. The latching lugs 22.1A slide into the insertion openings 28.1 of the respective mounting block 28 due to the push-on movement of the pedal head 10A, whereby the webs of the Pi-shaped retaining clips 22A elastically deform and the two latching lugs 22.1A of the corresponding retaining clip 22A are moved inwards towards each other and are tensioned. When the latching lugs 22.1A of the Pi-shaped retaining clips 22A reach the respective latching opening 24A, the latching lugs 22.1A snap outwards into their latching position, in which the latching lugs 22.1A engage behind the wall of the corresponding latching opening 24A. The transition to the latching position is usually associated with a clicking noise, which is used as a sign of a successful placement of the pedal head 10 or the pad support 14.

In a method according to the disclosure for disassembly of a pedal head 10 from such a pedal unit 5, a form-fit and/or friction-fit connection between a pad support 14 of the pedal head 10 and a movable housing cover 7 of the pedal unit 5 is first released. The pedal head 10 is then lifted off of the movable housing cover 7.

As can be further seen from FIG. 6, the disassembly of the pedal head 10A in the illustrated first exemplary embodiment of the fastening assembly 20A is performed with at least one simple auxiliary tool 30. The auxiliary tool 30 for disassembly of the pedal head 10A includes a handle portion 32 on which two parallel guide pins 34 are held. At the free ends, the guide pins 34 each have an actuation chamfer 36 which interact with the latching lugs 22.1A of the Pi-shaped retaining clips 22A to release the form-fit and/or friction-fit connection between the pad support 14 and the movable housing cover 7. By inserting the guide pins 34 with the actuation chamfer 36 into corresponding tool guides 16 inserted into the pad support 14, which lead to the latching element receptacle 24 configured as the latching opening 24A, the chamfered surfaces 36, when striking the latching lugs 22.1A of the Pi-shaped retaining clips 22A and the movement of the auxiliary tool 30 in the direction of the arrow, cause these to be pressed inwards in the direction of the arrow. In the end position of the auxiliary tool 30, the two webs of the corresponding Pi-shaped retaining clip 22A are compressed and can be moved in the vertical direction z out of the latching opening 22A. The pedal head 10A with the pad support 14 can thus be removed from the movable housing cover 7 in the vertical direction z of the pedal unit 5. As the pedal head 10A is fastened to the movable housing cover 7 in the illustrated exemplary embodiment with two Pi-shaped retaining clips 22A, two auxiliary tools 30 are used, which are actuated simultaneously to move the latching lugs 22.1A of the two Pi-shaped retaining clips 22A from the corresponding latching positions.

Figure 7:
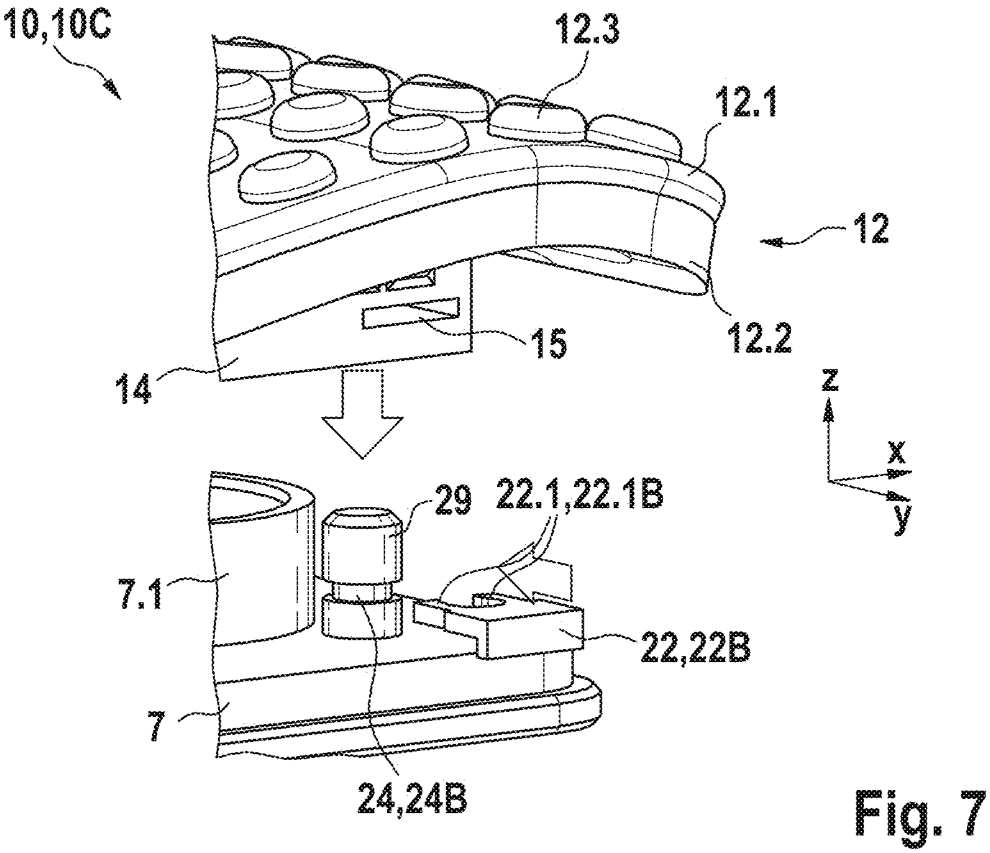
FIG. 7 shows a schematic exploded perspective view of a section of components of a second exemplary embodiment of a fastening arrangement for fastening a pedal head with a movable housing cover for the pedal units of FIGS. 1 to 3 according to the disclosure.
Figure 8:
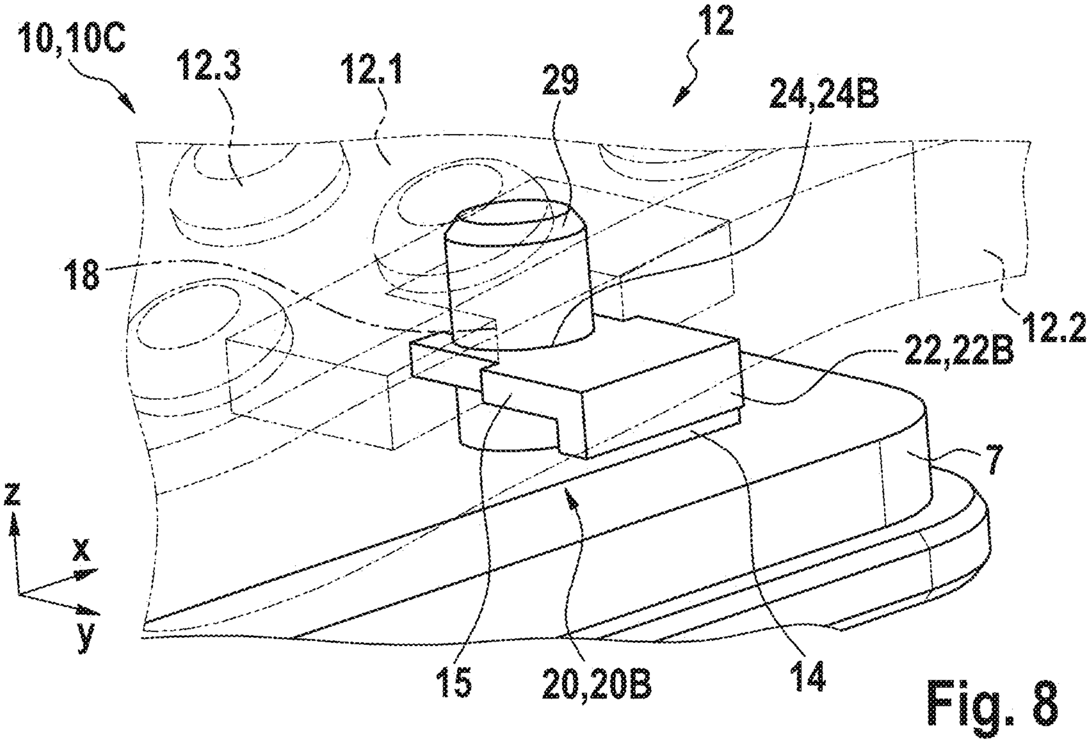
FIG. 8 shows a schematic perspective view of a section of the second exemplary embodiment of the fastening arrangement in FIG. 7 for fastening the pedal head with a movable housing cover for the pedal units of FIGS. 1 to 3 according to the disclosure.

As can be further seen from FIGS. 7 and 8, the pedal unit 5 configured as a brake pedal 5A in the second exemplary embodiment of the fastening arrangement 20B, comprises two latching elements 22 configured as spring-elastic retaining clips 22B. The retaining clips 22B comprise two parallel webs, which together delimit a round opening and are connected at one end via a transverse web. At the free ends, the two webs each have an inwardly-facing latching lug 22.1B. In the illustrated second exemplary embodiment of the fastening arrangement 20B, two cylindrical fastening bolts 29 are arranged on the movable housing cover 7, each of which comprises a latching element receptacle 24 configured as a circumferential latching groove 24B. The two fastening bolts 29 are arranged on opposite sides of the cylindrical spring receptacle 7.1. Corresponding receptacles 18 are configured in the pad support 14, in which the fastening bolts 29 can be inserted when the pedal head 10B is placed on the movable housing cover 7. Furthermore, a receiving opening 15 for the respective latching element 22 configured as a retaining clip 22B is formed on the pad support 14 for each fastening bolt 29. The individual receiving openings 15 in the illustrated exemplary embodiment run perpendicular to the receptacles 18 and each lead to a corresponding one of the receptacles 18, in which the locking bolts 29 are received. In the attached end position of the pedal head 10B, the receiving openings 15 are aligned with the circumferential latching groove 24B of the corresponding fastening bolt 29. In the mounted end position of the pedal head 10B, one of the latching elements 22 configured as a retaining clip 22B, is inserted so far into the corresponding receiving opening 15 that the two latching lugs 22.1B in their locking position shown in FIG. 8 encompass the fastening bolt 29 in the area of the circumferential latching groove and form the form-fit and/or friction-fit connection between the pad support 14 and the movable housing cover 7. For this purpose, in the mounted end position of the pedal head 10B, one of the latching elements 22 configured as a retaining clip 22B is inserted into the corresponding receiving opening 15. When inserting the respective retaining clip 22B, a force must be applied that is sufficient to widen the opening of the retaining clip 22B delimited by the two parallel webs so that the retaining clip 22B can encompass the fastening bolt. When widening, the latching lugs 22.1B are pressed outwards by the fastening bolt 29 and snap into their latching position shown in FIG. 8 when they reach their end position, in which the two latching lugs 22.1B encompass the fastening bolt 29 in the area of the circumferential latching groove 24B. This "clasping" acts as captive securing for the retaining clip 22B.

The pedal head 10C is disassembled in the illustrated second exemplary embodiment of the fastening arrangement 20B without auxiliary tools. For this purpose, the latching element 22 configured as a retaining clip 22B is pulled out of the receiving opening 15 of the pad support 14 by applying force that is sufficient to widen the opening of the retaining clip 22B delimited by the two parallel webs, and the form-fit and/or friction-fit connection between the pad support 14 and the movable housing cover 7 is released. As the pedal head 10C is fastened to the movable housing cover 7 by two fastening bolts 29 and two retaining clips 22B in the illustrated exemplary embodiment, two retaining clips 22B are removed before the pedal head 10C with the pad support 14 is lifted off the movable housing cover 7.

Figure 9:
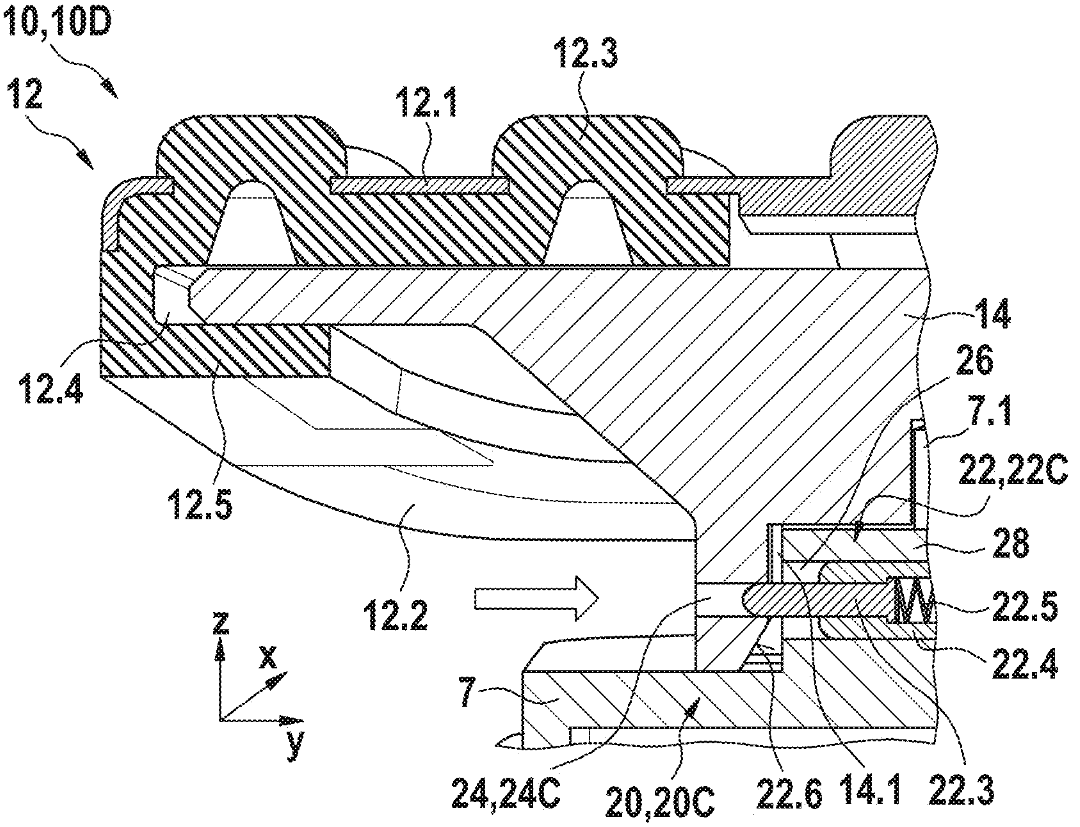
FIG. 9 shows a schematic perspective view of a section of a third exemplary embodiment of a fastening arrangement for fastening the pedal head with a movable housing cover for the pedal units of FIGS. 1 to 3 according to the disclosure.
Figure 10:
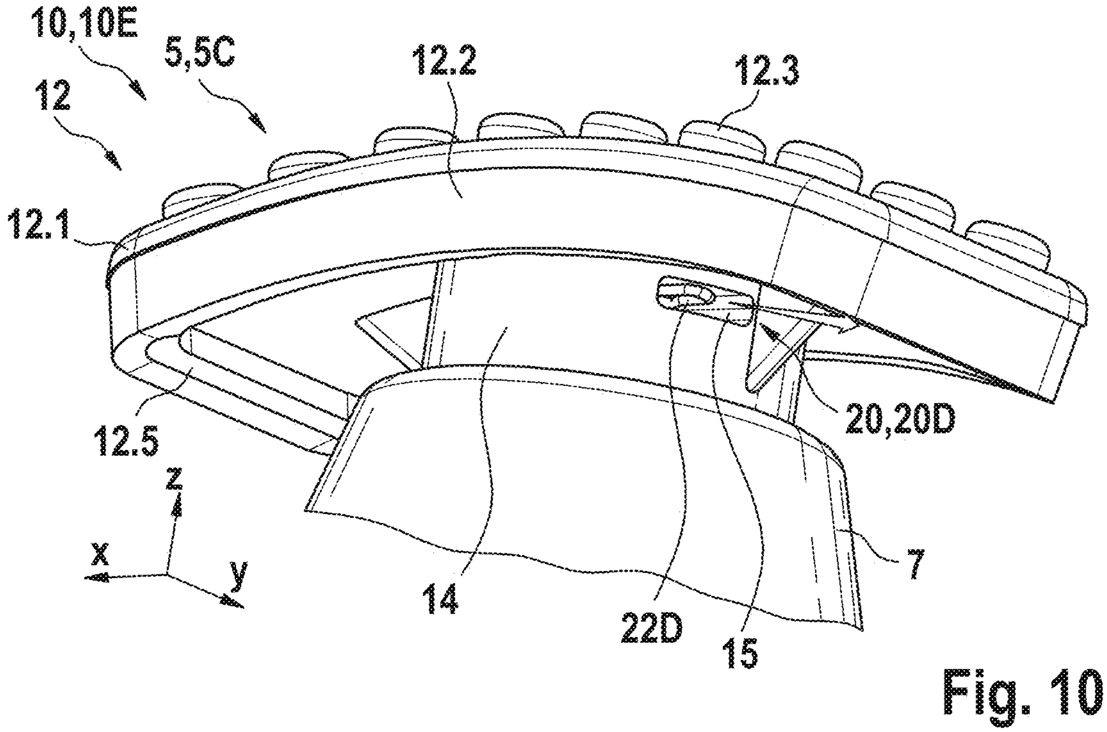
FIG. 10 shows a schematic perspective view of a section of a third exemplary embodiment of a pedal unit according to the disclosure for controlling a vehicle function with a fourth exemplary embodiment of a fastening arrangement for fastening a pedal head with a movable housing cover.
Figure 11:
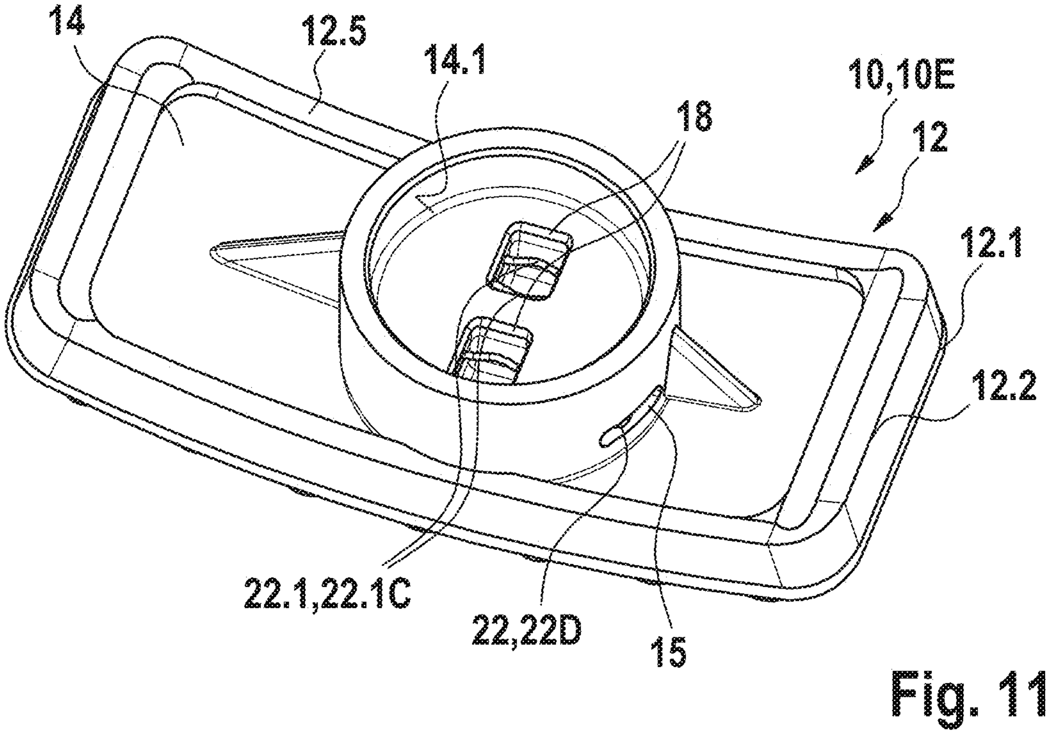
FIG. 11 shows a schematic perspective view of the pedal head of the pedal unit according to the disclosure in FIG. 10 from below.

As can be further seen from FIG. 9, the pedal unit 5 configured as a brake pedal 5A in the third exemplary embodiment of the fastening arrangement 20C, comprises a latching element 22 configured as a resilient pressure piece 22C. The resilient pressure piece 22C comprises a latching bolt 22.3 arranged in a hollow cylinder 22.4, which supports a spring element 22.5, which is configured here as a coil spring. As can be further seen in FIG. 9, the pressure piece 22C is arranged in a pressure piece receptacle 26, which is inserted into, for example, a mounting block 28. The mounting block 28 is arranged on the movable housing cover 7 in the illustrated exemplary embodiment. In the illustrated third exemplary embodiment of the fastening arrangement 20C, a latching element receptacle 24 configured as a latching bore 24C is arranged in the pad support 14, in which the latching bolt 22.3 is at least partially inserted in its latching position shown in FIG. 9. FIG. 9 shows only a section of the fastening arrangement 20C. Thus, the fastening arrangement 20C in the illustrated exemplary embodiment has a symmetrically identical design and comprises a further latching element 22 configured as a resilient pressure piece 22C at the other end of the fastening block 28 (not shown), the latching bolt 22.3 of which is inserted at least partially into the latching element receptacle 24 of the pad support 14, which is configured as a latching bore 24C.

As can be further seen from FIG. 9, the recess 14.1 comprises a lead-in chamfer 22.6 in the area of the latching bore 24C on the edge. These lead-in chamfers 22.6 of the recess 14.1 abut against the end of the latching bolt 22.3 when the pedal head 10D is fitted and move it into the high cylinder 22.4 against the force of the spring element 22.5 . . . . This means that the latching bolt 22.3 is moved into the hollow cylinder 22.4 by the push-on movement of the pedal head 10D and is aligned with the latching bore 24C in the pad support 14 when the pedal head 10D reaches its end position. When reaching the end position of the pedal head 10D, the spring element 22.5 at least partially moves the latching bolt 22.3 into the latching bore 24C, thereby blocking the pedal head 10D from moving in the vertical direction z of the pedal unit. As in the first exemplary embodiment of the fastening arrangement 20A, the pedal head 10D in the illustrated third exemplary embodiment of the fastening arrangement 20C is disassembled with at least one simple auxiliary tool (not shown). The auxiliary tool for disassembling the pedal head 10D is configured as a pin, for example, which is inserted into the latching bore 24C in the direction of the arrow and moves the latching bolt 22.3 to release the form-fit and/or friction-fit connection between the pad support 14 and the movable housing cover 7 against the force of the spring element 22.5 from the latching bore 24C. The pedal head 10D with the pad support 14 can thus be removed from the movable housing cover 7 in the vertical direction z of the pedal unit 5. As the pedal head 10D in the illustrated exemplary embodiment comprises a plurality of latching elements 22 configured as resilient pressure pieces 22C, a plurality of auxiliary tools (not shown) are used that are simultaneously inserted into the latching bores 24C to move the latching bolts 22.3 of the resilient pressure pieces 22C out of the corresponding latching bores 24C.

Figure 12:
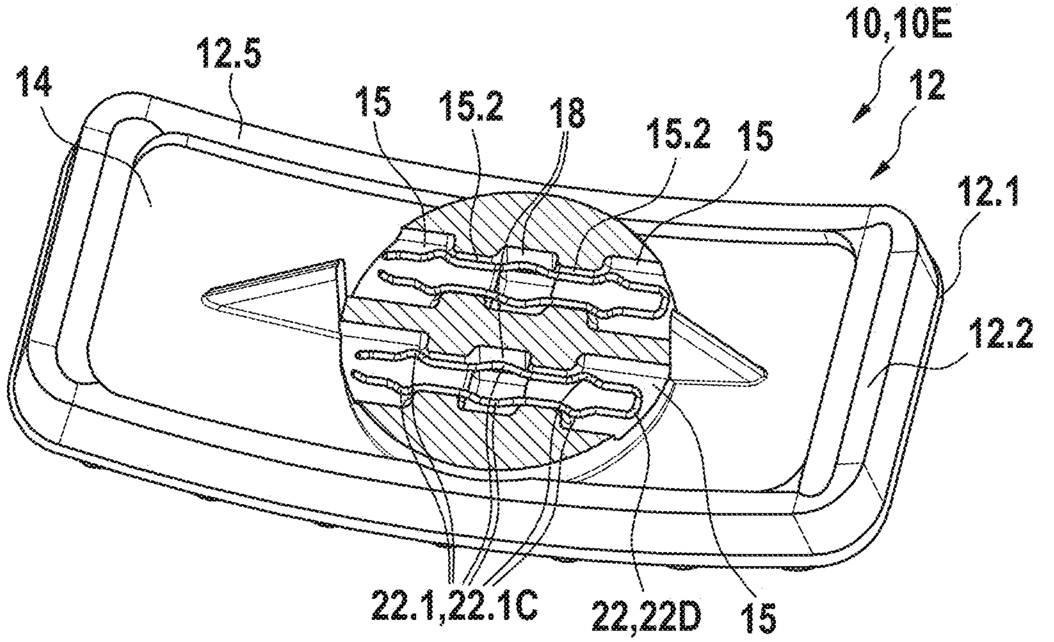
FIG. 12 shows a schematic perspective partial section view of the pedal head in FIG. 11.
Figure 13:
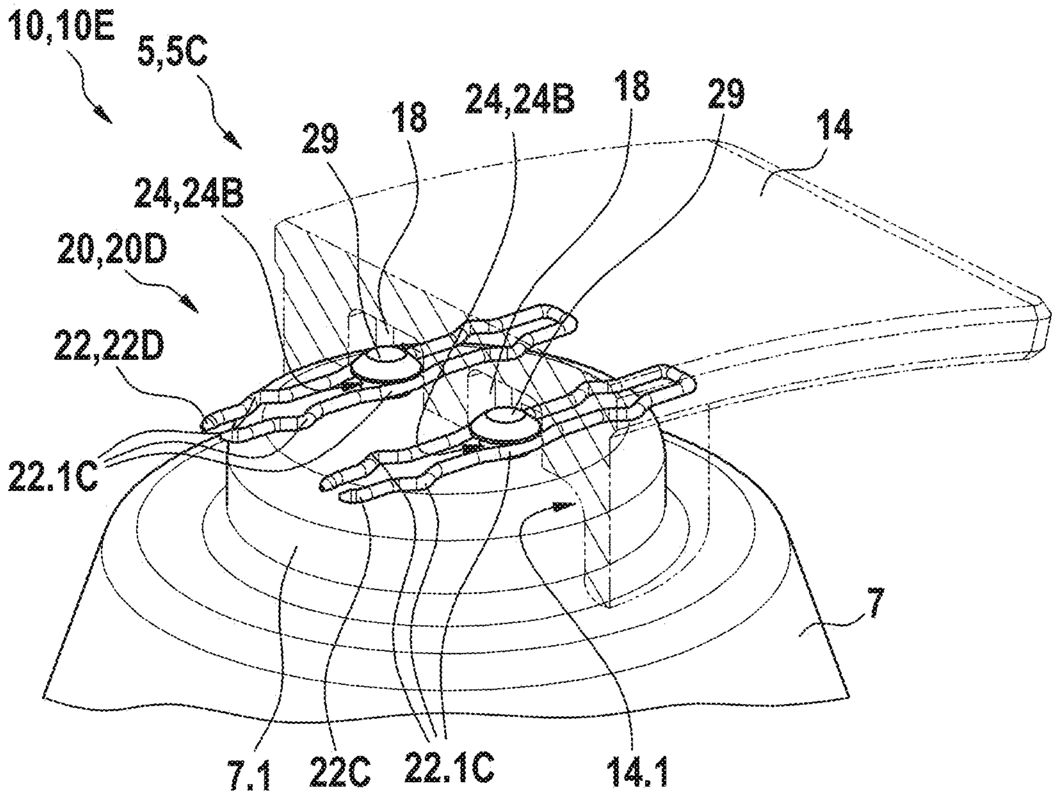
FIG. 13 shows a schematic perspective partial sectional view of a section of the pedal unit according to the disclosure in FIG. 10 without a pedal pad.

As can be further seen from FIGS. 10 to 13, the pedal unit 5 configured as an accelerator pedal 5C in the fourth exemplary embodiment of the fastening arrangement 20D comprises two latching elements 22 configured as spring-elastic retaining clips 22D. The retaining clips 22A have two parallel webs, each comprising three latching lugs 22.1C, and are connected to each other at one end via a transverse web. These latching lugs 22.1C are arranged in pairs opposite each other on the two parallel webs. In this case, a central pair of the latching lugs 22.1C arranged on the two webs together delimit a round opening. The free ends of the two webs are each bent inwards to facilitate insertion into a corresponding receiving opening 15 in the pad support 14. In the illustrated fourth exemplary embodiment of the fastening arrangement 20B, two cylindrical fastening bolts 29 are arranged at the movable housing cover 7 on the cover of the cylindrical spring holder 7.1, each of which comprises a latching element receptacle 24 configured as a circumferential latching groove 24B and a mushroom-shaped, conically tapering cap. The two fastening bolts 29 are arranged next to each other with a predetermined distance on the cover of the cylindrical spring receptacle 7.1. In the pad support 14, the recess 14.1 for partially receiving the cover of the cylindrical spring receptacle 7.1 or the cylindrical spring receptacle 7.1 of the movable housing cover 7 is arranged in a cylindrical portion. In the base of the cylindrical recess 14.1, corresponding receptacles 18 are configured, in which the fastening bolts 29 can be inserted when the pedal head 10E is placed on the movable housing cover 7. Furthermore, a receiving opening 15 for the respective latching element 22 configured as a retaining clip 22D is formed on the pad support 14 for each fastening bolt 29. The individual receiving openings 15 each open into a narrowed guide channel 15.2, which in the illustrated exemplary embodiment run perpendicular to a corresponding one of the receptacles 18 and completely penetrate this receptacle 18 as well as the cylindrical portion of the pad support 14. In the fully inserted state of the retaining clip 22D, a central pair of the latching lugs 22.1C arranged on the two webs of the respective retaining clip 22D and the round opening delimited by these latching lugs 22.1 are arranged in a corresponding receptacle 18 for one of the latching bolts 29. Starting from the transverse web of the retaining clip 22D connecting the two webs, a first pair of latching lugs 22.1C arranged opposite one another on the two parallel webs abut against opposite edges of the narrowed guide channel 15.2. Starting from the transverse web of the retaining clip 22D connecting the two webs, a third pair of latching lugs 22.1C arranged opposite one another on the two parallel webs abut against opposite edges of the narrowed guide channel 15.2 at the other end of the narrowed guide channel 15.2 . . . . When inserting the respective retaining clip 22D, a force must be applied which is sufficient to compress the two parallel webs in the area of the third pair and the central pair of the opposing latching lugs 22.1C, such that the latching lugs 22.1C can penetrate the narrowed guide channel 15.2. When compressing the two parallel bars of the respective holding clip 22D, the latching lugs 22.1C are pushed inwards by the wall of the narrowed guide channel 15.2. When the respective retaining clip 22D reaches its end position, the latching lugs 22.1C of the third pair at the end of the narrowed guide channel 15.2 and the latching lugs 22.1C of the central pair in the area of the respective receptacle 18 for the corresponding fastening bolt 29 snap apart. Thus, the corresponding retaining clip 22D is braced between the two receiving openings 15 at the ends of the narrowed guide channel 15.2, as can be seen in FIG. 12. This "bracing" acts as captive securing for the retaining clip 22D.

When the pedal head 10E is mounted on the housing cover 7, the two latching bolts 29 are each received in a receptacle 18. When mounting the pedal head 10E, a force must be applied which is sufficient to widen the opening of the retaining clip 22D delimited by the central pair of latching lugs 22.1C of the two parallel webs, such that the fastening bolt 29 can penetrate this opening and be inserted into the receptacle 18. When widening, the latching lugs 22.1C are pushed outwards through the mushroom shaped cap of the fastening bolt 29 and snap back to their latching position shown in FIG. 13 when the mounted pedal head 10E has reached its end position. In the latching position, the two latching lugs 22.1C encompass the fastening bolt 29 in the area of the circumferential latching groove 24B and form the form-fit and/or friction-fit connection between the pad support 14 and the movable housing cover 7.

Disassembly of the pedal head 10E is accomplished in the illustrated fourth exemplary embodiment of the fastening arrangement 20D without auxiliary tools. For this purpose, the locking element 22 configured as a retaining clip 22D, is pulled out of the narrowed guide channel 15.1 of the pad support 14 by applying a force and the form-fit and/or friction-fit connection between the pad support 14 and the movable housing cover 7 is released. As the pedal head 10E is fastened to the movable housing cover 7 by two fastening bolts 29 and two retaining clips 22D in the illustrated exemplary embodiment, two retaining clips 22D are removed before the pedal head 10E with the pad support 14 is lifted off of the movable housing cover 7. To facilitate disassembly, simple pliers may be used as an auxiliary tool to pull the retaining clip 22D out of the narrowed guide channels 15.2.

In an alternative exemplary embodiment of the pedal unit 5 (not shown), the fastening arrangement 20 comprises at least one bolt element and at least one bolt element receptacle, which are arranged to block a movement of the pad support 14 in the disassembly direction when mounted. Here at least one bolt element is configured as a pin, which is at least partially inserted into a bolt element receptacle configured as a locking bore when mounted. The at least one bolt element is arranged on the pad support 14 and the at least one bolt element receptacle is arranged on the movable housing cover 7. In a further alternative exemplary embodiment of the pedal unit 5 (not shown), the at least one bolt element is arranged on movable housing cover 7 and the at least one bolt element receptacle is arranged on the pad support 14.

What is claimed is:

1. A pedal unit for controlling a controllable vehicle function, the pedal unit having a modularly constructed pedal head, comprising:

a pad support;

a movable housing cover;

a replaceable pedal pad configured to receive an actuation force of a driver's foot, wherein the pad support and the replaceable pedal pad are configured to releasably connect the pedal pad and the pad support; and a fastening arrangement configured to connect the pad support to the movable housing cover in at least one releasable form-fit connection and/or at least one releasable friction-fit connection.

2. The pedal unit according to claim 1, wherein the fastening arrangement comprises at least one latching element and at least one latching element receptacle which are configured to form a latching connection between the pad support and the movable housing cover when mounted and to prevent or at least inhibit removal of the pad support in a disassembly direction.

3. The pedal unit according to claim 2, wherein the at least one latching element is configured as a spring-elastic retaining clip with at least one latching lug.

4. The pedal unit according to claim 3, wherein the at least one latching element receptacle is configured as at least one latching opening into which the at least one latching lug of the at least one latching element is inserted when mounted and engages behind a wall of the at least one latching opening.

5. The pedal unit according to claim 3, wherein the at least one latching element receptacle is configured as a latching groove which at least partially encompasses the at least one latching element when mounted.

6. The pedal unit according to claim 2, wherein the at least one latching element is configured as a resilient pressure piece with at least one latching bolt.

7. The pedal unit according to claim 6, wherein the at least one latching element receptacle is configured as a latching bore into which the at least one latching bolt is at least partially inserted when mounted.

8. The pedal unit according to claim 2, wherein the at least one latching element or at least one bolt element is arranged on the pad support and at least one latching element receptacle or at least one bolt element receptacle is arranged on the movable housing cover.

9. The pedal unit according to claim 2, wherein the at least one latching element or at least one bolt element is arranged on the movable housing cover and at least one latching element receptacle or at least one bolt element receptacle is arranged on the pad support.

10. The pedal unit according to claim 1, wherein the fastening arrangement comprises at least one bolt element and at least one bolt element receptacle which are configured to block movement of the pad support in a disassembly direction when mounted.

11. The pedal unit according to claim 1, wherein:

the movable housing cover is operably connected to a sensor housing, and at least one sensor arrangement is arranged in the sensor housing and is configured to detect and evaluate up and down movement of the movable housing cover.

12. The pedal unit according to claim 1, wherein the controllable vehicle function is a braking function or an acceleration function.

13. A method for assembling the pedal unit according to claim 1, comprising:

(a) mounting the pedal unit in a vehicle without the pedal head of the pedal unit attached; and (b) after step (a), releasably attaching the pedal head, which comprises the pedal pad, to the pad support which is attached to the movable housing cover of the pedal unit such that the pad support of the pedal head is connected to the movable housing cover of the pedal unit in the at least one releasable form-fit connection and/or the at least one releasable friction-fit connection.

14. A method for disassembling the pedal head from the pedal unit according to claim 1, the method comprising:

(a) releasing the at least one releasable form-fit connection and/or the at least one releasable friction-fit connection between the pad support of the pedal head and the movable housing cover of the pedal unit; and (b) lifting off the pedal head from the movable housing cover after step (a).

15. The pedal unit according to claim 1, wherein the movable housing cover is a small stroke movable housing cover.

16. The pedal unit according to claim 1, wherein the replaceable pedal pad is connected to the movable housing cover along a vertical direction of the pedal unit.

17. The pedal unit according to claim 1, wherein:

the replaceable pedal pad is configured to receive the actuation force of the driver's foot downwardly along a first axis;

the fastening arrangement is configured to releasably connect the pad support to the movable housing cover;

the fastening arrangement includes a fastening component which, by movement of at least a portion of the fastening component along a second axis, at least one of releasably connects the pad support to the movable housing cover, and releases the pad support from the movable housing cover; and the second axis is perpendicular to the first axis.

* * * * *